United States Patent Office 3,736,328
Patented May 29, 1973

3,736,328
CERTAIN 3-HALO-5-SULFINYL-1,2,4-THIADIAZOLES
Lawrence S. Wittenbrook, 720 W. 5th St., and Richard J. Timmons, 222 Grand Ave., both of Marysville, Ohio 43040
No Drawing. Continuation-in-part of application Ser. No. 578,991, Sept. 13, 1966. This application Feb. 28, 1969, Ser. No. 803,411
Int. Cl. C07d *91/60*
U.S. Cl. 260—302 SD                4 Claims

ABSTRACT OF THE DISCLOSURE

Novel 3 - (halogen) - 5-(organothio)-, (sulfinyl)-, and (sulfonyl)-1,2,4-thiadiazoles and their production and use.

---

This application is a continuation-in-part of application Ser. No. 578,991, filed Sept. 13, 1966 now abandoned.

This invention relates to novel 1,2,4-thiadiazoles and, more specifically, to 1,2,4-thiadiazoles having the formula (I) 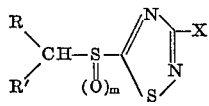

wherein $m$ is 0 to 2, R' is hydrogen or alkyl, X is chlorine or bromine, and R is hydrogen, alkyl, vinyl, substituted vinyl, phenyl, substituted phenyl, alkoxymethyl, carbamoyl, or carboalkoxy when $m$ is 0 or 2 and hydrogen, alkyl, phenyl, substituted phenyl, alkoxymethyl, carbamoyl, or carboalkoxy when $m$ is 1.

Preferred are compounds of Formula I where R' is hydrogen of $C_2$–$C_9$ alkyl and R is hydrogen, $C_1$–$C_9$ alkyl, vinyl, halogen substituted vinyl, phenyl, phenyl substituted by halogen, nitro, $C_1$–$C_4$ alkoxy, or $C_1$–$C_4$ alkyl or a combination thereof, $C_1$–$C_4$ alkoxymethyl, carbamoyl, or $C_1$–$C_4$ carboalkoxy when $m$ is 0 or 2 and hydrogen, $C_1$–$C_9$ alkyl, phenyl, phenyl substituted by halogen, nitro, $C_1$–$C_4$ alkoxy, or $C_1$–$C_4$ alkyl or a combination thereof $C_1$–$C_4$ alkoxymethyl, carbamoyl, or $C_1$–$C_4$ carboalkoxy when $m$ is 1.

The compounds of the present invention possess valuable pesticidal and growth regulating properties and are particularly distinguished by outstanding insecticidal, herbicidal, fungicidal, and fumigant type activties. They can be formulated with a variety of dispersible carriers or vehicles into solutions, emulsions, suspensions, emulsifiable concentrates, spray powders, pastes, soluble powders, dusting agents, granulates, etc. Furthermore, they may be present in such formulation or compositions in the form of mixtures with one another and with other known active substances, if desired. Appropriate formulation techniques are described in U.S. Pats. Nos. 3,076,699 and 3,083,089, which are hereby incorporated by reference, and elsewhere in the literature.

From the foregoing it will be apparent that one primary and important object of the invention resides in the provision of certain new and novel 1,2,4-thiadiazoles.

A related and also important object of the invention is the provision of 1,2,4-thiadiazoles having valuable pesticidal and growth regulating properties.

Yet another related and important object of the invention resides in the provision of novel processes for producing the 1,2,4-thiadiazoles of the present invention.

In conjunction with the preceding object, other important objects of the invention are the provision of novel methods for preparing 3-(halogen)-5-(organothio)-1,2,4-thiadiazoles [1] and novel methods for converting such compounds to 3-(halogen)-5-(sulfinyl)-1,2,4-thiadiazoles and 3-(halogen)-5-(sulfonyl)-1,2,4-thiadiazoles.

Further objects and advantages and other novel features of the present invention will become apparent to those skilled in the arts to which this invention pertains from the following detailed description and discussion of exemplary embodiments of the invention and the appended claims.

With regard to the foregoing, we have found that when monovalent metal or ammonium mono-esters of cyanodithiomicocarbonic acids of the general formula.[2]

(II) 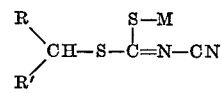

wherein R and R' are defined above and M is alkali metal or ammonium, preferably potassium, are brought into contact with halogenating agents such as elemental chlorine, elemental bromine, sulfuryl chloride, thionyl chloride, trichloromethane sulfenyl chloride, or phosphorus pentachloride, a novel oxidative cyclization reaction occurs, producing the novel 5-organothio-1,2,4-thiadiazoles of the present invention (compounds of the Formula I wherein $m$ is 0). This reaction can be illustrated by the following equation:

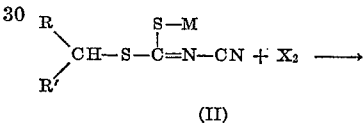

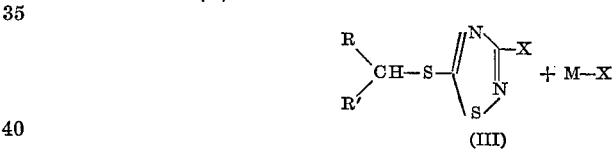

in which M, R, R', and X have the meaning indicated above.

This oxidative cyclization reaction is preferably carried out at reduced temperatures initially, followed by a period at elevated temperatures from 25° C. to the boiling temperature of the reaction mixture and is also preferably carried out in the presence of a suitable solvent. Chlorinated hydrocarbons (especially chloroform, methylene chloride, and the like) as well as aqueous, and alcoholic, and aqueous-alcoholic solvents are suitable for the oxidative cyclization reaction.[3]

Some of the new 5-organothio-1,2,4-thiadiazoles produced according to the present invention are obtained in the form of solid crystalline compounds which have sharp melting points and which can be recrystallized from conventional solvents. However, the majority are water-insoluble oils which can be distilled under reduced pressure.

The sulfoxides (Structure I, $m=1$) and sulfones (Structure I, $m=2$) of this invention can in most cases be pre-

---

[1] "Organothio" is used herein to identify radicals of the formula R and R'CH—S— where R and R' are as defined previously.
[2] Methods of preparing exemplary monovalent monoesters of Formula II are described in co-pending application Ser. No. 578,974 filed Sept. 13, 1966, which is hereby incorporated by reference and which may be referred to by the reader, if desired.
[3] Other conventional, readily ascertainable solvents can also be employed, if desired. Those listed above have the advantages of being economical and of giving good yields, advantages which may not be possessed to the same extent by other solvents.

pared by effecting the reaction shown in the following equation:

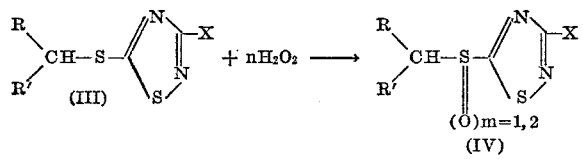

in which R, R' and X have the same meaning as above, and n is 1 for structures where m=1 and 2 or more where m=2. The reaction is preferably carried out at temperatures below room temperature (25° C.) and preferably, in most cases, in the presence, of an oxidizing agent such as hydrogen peroxide in a mixture of acetic anhydride and glacial acetic acid or a peracid such as peracetic or perbenzoic.

The oxidation of 5-organothio-1,2,4-thiadiazoles (Structure III), which contain an oxidizable radical (e.g., vinyl) in addition to the sulfur atom at the 5-position to a sulfoxide or a sulfone cannot be effected with hydrogen peroxide in an oxidizing agent such as acetic anhydride and glacial acetic acid. However, at least where the desired product is a sulfone (a compound of Structure IV with m=2) and R is vinyl, it can be prepared from the corresponding 5-organothio-1,2,4-thiadiazole by using an oxidizing agent such as m-chloroperbenzoic acid (or a similar oxidizing agent such as m-bromoperbenzoic acid) in a solvent medium such as chloroform at a temperature below room temperature.

Some of the new sulfoxides and sulfones of this invention are obtained in the form of solid crystalline compounds which have sharp melting points and can be recrystallized from conventional solvents. Others, however, are oils which cannot be distilled without decomposition, even under strongly reduced pressure.

The immediately succeeding examples illustrate the preparation of the novel 5-organothio-1,2,4-thiadiazoles contemplated by the present invention. These examples are for purpose of illustration only and are accordingly not intended to limit the scope of the invention.

EXAMPLE 1

Preparation of 3-chloro-5-methylthio-1,2,4-thiadiazole

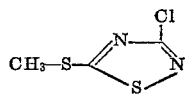

To a stirred slurry of potassium methyl cyanodithioimidocarbonate (19.4 g., 0.10 mole) in 200 ml. of chloroform cooled to 0° C. was added dropwise 14.8 g. (0.11 mole) of sulfuryl chloride. Upon completion of the addition, the reaction mixture was stirred at 0° C. for 1 hour, at room temperature for 1 hour, and at reflux (61° C.) for 3.5 hours. When cooled, the reaction mixture was filtered; and the filtrate was evaporated in vacuo to give 11.7 g. (70% yield) of crude 3-chloro-5-methylthio-1,2,4-thiadiazole as an oil, which solidified when allowed to stand. The solidified product was recrystallized from hexane and pentane. The purified 3-chloro-5-methylthio-1,2,4-thiadiazole thus obtained was a colorless crystalline solid which melted at 54–55° C.

The 3-chloro-5-methylthio-1,2,4-thiadiazole prepared by this novel process was found to have the following elemental analysis:

Calculated for $C_3H_3ClN_2S_2$ (percent): C, 21.62; H, 1.81; Cl, 21.27; S, 38.48. Found (percent): C, 21.88; H, 1.70; Cl, 21.11; S, 38.16.

The following compounds can be prepared in an analogous manner (the higher homologues were obtained as liquids which were purified by fractional distillation at reduced pressure):

| Compound | Yield, (percent)* | Boiling point, ° C./mm. Hg |
|---|---|---|
| 3-chloro-5-ethylthio-1,2,4-thiadiazole | 66 | 66/0.25 |
| 3-chloro-5-isopropylthio-1,2,4-thiadiazole | 84 | 66–68/0.15 |
| 3-chloro-5-isobutylthio-1,2,4-thisdiazole | 83 | 82/0.05 |
| 3-chloro-5-$n$-butylthio-1,2,4-thiadiazole | 82 | 94–96/0.45 |
| 3-chloro-5-sec-butylthio-1,2,4-thiadiazole | 43 | 64–65/0.23 |
| 3-chloro-5-hexylthio-1,2,4-thiadiazole | 86 | 110–113/0.24 |
| 3-chloro-5-decylthio-1,2,4-thiadiazole | 80 | 149–151/0.20 |

*Based on crude product.

EXAMPLE 2

Preparation of 3-chloro-5-benzylthio-1,2,4-thiadiazole

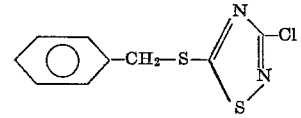

To a stirred slurry of potassium benzyl cyanodithioimidocarbonate (420 g., 0.17 mole) in 225 ml. of chloroform cooled to 5° C. was added dropwise 26.8 g. (0.20 mole) of sulfuryl chloride. Upon completion of the addition, the reaction mixture was stirred at 0° C. for 1 hour at reflux for 3.5 hours. The white solid which resulted was filtered, and the filtrate was evaporated in vacuo at an elevated temperature (steam bath), giving 34.2 g. (85% yield) of crude 3-chloro-5-benzylthio-1,2,4-thiadiazole.[4] Fractional distillation of the crude product under reduced pressure produced pure 3-chloro-5-benzylthio-1,2,4-thiadiazole boiling at 145–147° C./0.25 mm. Hg.

Calculated for $C_9H_7ClN_2S_2$ (percent): C, 45.53; H, 2.91; S, 26.42. Found (percent): C, 45.05; H, 3.00; S, 26.66.

The following compounds can be prepared in an analogous manner:

| Compound | Yield, percent* | Melting point, ° C. | Boiling point, ° C./mm. Hg |
|---|---|---|---|
| 3-chloro-5-(4-nitrobenzylthio)-1,2,4-thiadiazole | 50 | 94–7 | |
| 3-chloro-5-(3,4-methylenedioxybenzylthio)-1,2,4-thiadiazole | 85 | 57–8 | |
| 3-chloro-5-(pentafluorobenzylthio)-1,2,4-thiadiazole | 72 | | 109/0.05 |

*Based on crude product.

EXAMPLE 3

Preparation of 3-chloro-5-allylthio-1,2,4-thiadiazole

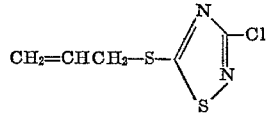

To a stirred slurry of potassium allyl cyanodithioimidocarbonate (78.0 g., 0.40 mole) in 300 ml. chloroform cooled to 0° C. was added dropwise 59 g. (0.44 mole) of sulfuryl chloride. After the addition was complete, the reaction mixture was stirred at 0° C. for 1 hour, at room temperature for 1 hour, and at reflux temperature for 3.5 hours. The reaction mixture was cooled and filtered, and the filtrate was evaporated under reduced pressure at steam bath temperature. Further evaporation was effected under high vacuum at room temperature, producing crude 3-chloro-5-allylthio-1,2,4-thiadiazole as an oil. Fractionation of this crude product at reduced pressure gave 17.0 g. (22% yield) of liquid boiling at 81–85° C./0.50 mm. Hg.

Calculated for $C_5H_4ClN_2S_2$ (percent): C, 26.44; H, 1.78; N, 12.33. Found (percent): C, 26.50; H, 1.84; N, 11.86.

---

[4] The infrared spectrum of the crude product showed the presence of a nitrile-containing contaminant.

The following compounds can be prepared in an analogous manner:

| Compound | Yield, percent* | Boiling point, °C./mm. Hg |
| --- | --- | --- |
| 3-chloro-5-(2-chloroallylthio)-1,2,4-thiadiazole | 62 | |
| 3-chloro-5-(1,1,2-trifluorobutenylthio)-1,2,4-thiadiazole | 55 | 64–6/0.06 |

*Based on crude product.

EXAMPLE 4

Preparation of 3-chloro-5-(α-acetamidothio)-1,2,4-thiadiazole

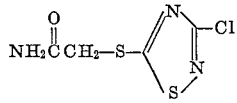

To a stirred slurry of potassium S-(α-acetamide)-cyanodithioimidocarbonate (2.1 g., 0.01 mole) in 50 ml. chloroform cooled to 0° C. was added dropwise 1.5 g. (0.011 mole) of sulfuryl chloride. After the addition was complete, the slurry was stirred for 24 hours at room temperature. Filtration of the insoluble material gave 2.4 g. of white solid. Treatment of this crude product with water (dissolved inorganic salts) and further filtration gave 1.1 g. of crude 3 - chloro - 5 - (α-acetamidothio)-1,2,4-thiadiazole. An additional 0.4 g. of product (total yield was 1.4 g. or 71% of the theoretical) was obtained by evaporation in vacuo of the filtrate from the reaction mixture. Recrystallization of the crude product from chloroform gave pure, crystalline 3-chloro-5-(α-acetamidothio) - 1,2,4 - thiadiazole which melted at 137–138° C.

Calculated for $C_4H_4ClN_3OS_2$ (percent): C, 22.91; H, 1.92; N, 20.04. Found (percent): C, 22.55; H, 1.92; N, 20.00.

EXAMPLE 5

Preparation of 3-chloro-5-(α-thioethylacetate)-1,2,4-thiadiazole

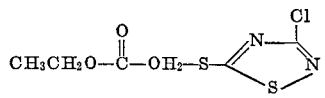

To a stirred slurry of potassium S-α-(ethylacetate)-cyanodithioimidocarbonate (7.5 g., 0.03 mole) in 25 ml. chloroform cooled to 0° C. was added dropwise 4.7 g. (0.03 mole) of sulfuryl chloride. The reaction mixture was allowed to warm to room temperature and was then stirred for 24 hours. Filtration of the reaction mixture and evaporation of the filtrate under reduced pressure gave 5.1 g. (70% yield) of crude 3-chloro-5-(α-thioethylacetate)-1,2,4-thiadiazole as an oil. Purified product was obtained by fractional distillation (Falling Film Apparatus) at 56° C./0.3 mm. Hg.

Calculated for $C_6H_7ClN_2O_2S_2$ (percent): C, 30.19; H, 2.96; N, 11.74. Found (percent): C, 29.35; H, 2.90; N, 11.40.

EXAMPLE 6

Preparation of 3-chloro-5-(β-ethoxyethylenethio)-1,2,4-thiadiazole

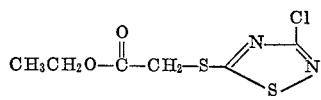

To a stirred slurry of potassium S-(β-ethoxyethylene) cyanodithioimidocarbonate (16.2 g., 0.07 mole) in 125 ml. chloroform cooled to 0° C. was added dropwise 11.5 g. (0.08 mole) of sulfuryl chloride. The reaction mixture was stirred for 1 hour at 0° C. after completion of the addition, 1 hour at room temperature, and 3.5 hours at reflux temperature. After cooling, the insoluble white solid present was filtered, and the filtrate was evaporated in vacuo to give 12.7 g. (81% yield) of crude 3-chloro-5-(β-ethoxyethylenethio)-1,2,4-thiadiazole as an oil. Fractional distillation of this crude material at reduced pressure gave pure 3 - chloro - 5 - (β-ethoxyethylenethio)-1,2,4-thiadiazole boiling at 87° C./0.06 mm. Hg.

Calculated for $C_6H_9ClN_2OS_2$ (percent): C, 32.07; H, 4.04; N, 12.46. Found (percent): C, 31.45; H, 3.40; N, 13.02.

Although the oxidative cyclization of mono-valent mono-esters of cyanodithioimidocarbonic acid to 1,2,4-thiadiazoles is conveniently carried out with sulfuryl chloride in chloroform as demonstrated by the preceding examples, other halogenating agents, for example chlorine in solvents such as water or chloroform, can also be employed. The preparation of 3-chloro-5-methylthio-1,2,4-thiadiazole by the use of elemental chlorine is illustrated in more detail in the following examples.

EXAMPLE 7

Preparation of 3-chloro-5-(methylthio)-1,2,4-thiadiazole

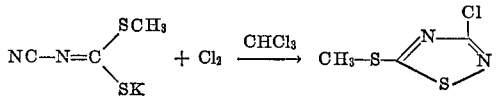

Chlorine gas was introduced at a rate of ca. 1 bubble/sec. for a period of ca. 1 hour into a stirred slurry of potassium methyl cyanodithioimidocarbonate (8.5 g., 50 mmoles), and 150 ml. chloroform cooled to −5° C.

The reaction mixture was then allowed to come to room temperature and stirred for 2 hours, giving a white solid. Filtration of the white solid and evaporation of the filtrate under reduced pressure to low volume gave a maroon liquid. When this was cooled, a crystalline solid formed. The solid was filtered, washed with pentane, and dried to give 4.5 g. (55% yield) of a pure crystalline solid, melting point 51–54° C., which was identical in all respects to the 3-chloro-5-methylthio-1,2,4-thiadiazole described in Example 1.

EXAMPLE 8

Preparation of 3-(chloro)-5-(methylthio)-1,2,4-thiadiazole

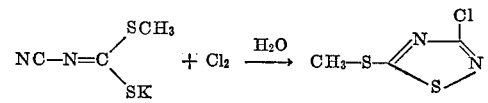

Chlorine gas was introduced at a rate of ca. 1 bubble/sec. for a period of ca. 1 hour into a stirred solution of potassium methyl cyanodithioimidocarbonate (8.5 g., 50 mmoles) in 100 ml. water cooled to 0° C. A precipitate formed during the addition of the chlorine gas. Upon completion of the addition, the reaction mixture was allowed to warm slowly to room temperature, and chloroform was added to the stirred reaction mixture. The chloroform soluble portion was separated, dried over anhydrous sodium sulfate, filtered, and evaporated in vacuo to give an oil. Purification of the oil produced 5.0 g. (60% yield) of a material identical in all respects to the 3-chloro-5-methylthio-1,2,4-thiadiazole of Example 1.

Sulfuryl chloride and elemental chlorine are by no means the only halogenating agents which may be employed in the practice of the present invention, and the foregoing examples are not intended to produce this implication. To further illustrate the lack of criticality in the selection of a halogenating agent, elemental bromine was reacted with potassium methyl cyanodithioimidocarbonate to give 3-bromo-5-(methylthio)-1,2,4-thiadiazole in accord with the following equation:

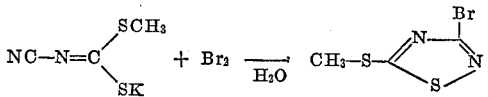

The procedure which was followed is described in more detail in the following example.

The following compounds are exemplary of those which can be prepared in an analogous manner:

| Compound | Percent | | | | | |
|---|---|---|---|---|---|---|
| | Calculated | | | Found | | |
| | C | H | S | C | H | S |
| 3-chloro-5-(isopropylsulfinyl)-1,2,4-thiadiazole | 28.50 | 3.35 | 30.43 | 28.35 | 3.02 | 29.81 |
| 3-chloro-5-(n-butylsulfinyl)-1,2,4-thiadiazole | 32.07 | 4.04 | 28.53 | 32.60 | 3.44 | 28.38 |
| 3-chloro-5-(hexylsulfinyl)-1,2,4-thiadiazole | 38.01 | 5.18 | 25.37 | 38.20 | 5.08 | 25.45 |

EXAMPLE 9

Preparation of 3-bromo-5-methylthio-1,2,4-thiadiazole

Bromine (8.8 g., 0.06 mole) was added dropwise to a stirred solution of potassium methyl cyanodithioimidocarbonate (8.5 g., 0.05 mole) in 100 ml. water previously cooled to 0° C. The slurry was then stirred for 1 hour at 0° C. and 2.5 hours at room temperature. Sodium thiosulfate was added in sufficient quantity to destroy excess bromine. Extraction of the reaction mixture with chloroform gave an organic portion which was dried over anhydrous sodium sulfate. When filtered and evaporated in vacuo, the chloroform extract yielded 5.7 g. (54% yield) of crude 3-bromo-5-(methylthio)-1,2,4-thiadiazole as a pale yellow semisolid.

Recrystallization of the crude product from pentane gave pure 3-bromo-5-(methylthio)-1,2,4-thiadiazole in the form of colorless rods M.P. 57-58° C.

Calculated for $C_3H_3BrN_2S_2$ (percent): C, 17.06; H, 1.43; N, 13.27. Found (percent): C, 17.05; H, 1.62; N, 12.96.

Although the solvent employed in the procedure described in Example 9 was water, different solvents such as chloroform or methylene chloride can be employed for the cyclization reaction, if desired.

Those compounds of the present invention having the Formula I where $m=1$ (5-(sulfinyl)-1,2,4-thiadiazoles) can be prepared by reacting one molar equivalent of an appropriate 3-(halogen)-5-(organothio) - 1,2,4 - thiadiazole[5] with one molar equivalent of hydrogen peroxide in the presence of glacial acetic acid and acetic anhydride. As an example, a 72% yield of 3-chloro-5-(methylsulfinyl)-1,2,4-thiadiazole was obtained by the following procedure:

EXAMPLE 10

Preparation of 3-chloro-5-(methylsulfinyl)-1,2,4-thiadiazole

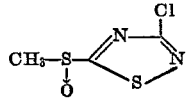

To a stirred solution of 3-chloro-5-(methylthio)-1,2,4-thiadiazole (16.6 g., 0.10 mole) in 25 ml. glacial acetic acid and 25 ml. acetic anhydride cooled to 0° C. was added dropwise 12.3 g. of 30% hydrogen peroxide (0.10 mole). Upon completion of the addition, the reaction mixture was stirred at 0° C. for 1 hour and then at room temperature for 2 days. Unreacted hydrogen peroxide was decomposed with a small amount of manganese dioxide. This mixture was filtered, and the filtrate was evaporated in vacuo at 80° C. to give a crude residue. Treatment of this residue with water and sodium bicarbonate followed by extraction with chloroform gave a soluble organic portion which was dried over anhydrous sodium sulfate, filtered, and evaporated to dryness under reduced pressure. This produced 13.0 g. (72% yield) of solid which, recrystallized from methanol, gave pure, white, crystalline 3-chloro-5-(methylsulfinyl)-1,2,4-thiadiazole, M.P. 99-99.5° C.

Calculated for $C_3H_3ClN_2OS_2$ (percent): C, 19.73; H, 1.65; S, 35.11. Found (percent): C, 19.50; H, 1.44; S, 35.26.

[5] "Halogen" can be either chlorine or bromine.

Those compounds of the present invention having the Formula I wherein $m=2$ (5 - (sulfonyl) - 1,2,4 - thiadiazoles) can be prepared by reacting one molar equivalent of an appropriate 3-(halogen)-5-(organothio)-1,2,4-thiadiazole with two molar equivalents (or more) of hydrogen peroxide in the presence of glacial acetic acid and acetic anhydride. As an example, a 56% yield of 3-chloro-5-(4-nitrobenzylsulfonyl)-1,2,4-thiadiazole was prepared by the following procedure:

EXAMPLE 11

Preparation of 3-chloro-5-(4-nitrobenzylsulfonyl)-1,2,4-thiadiazole

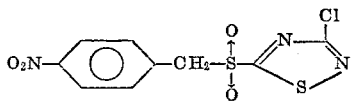

To a stirred solution of 3-chloro-5-(4-nitrobenzylthio)-1,2,4-thiadiazole (24.4 g., 0.08 mole) in 25 ml. glacial acetic acid and 25 ml. of acetic anhydride cooled to 0° C. was added dropwise 24.5 g. of 30% hydrogen peroxide (0.22 mole). After completion of the addition, the solution was stirred at 0° C. for 2 hours and then for 2 days at room temperature. A solid precipitated during this period. The reaction mixture was diluted with 20 ml. glacial acetic acid, cooled to 0° C., and a small quantity of manganese dioxide was added to decompose excess hydrogen peroxide. The insoluble solid was separated by filtration, washed with glacial acetic acid, and dried under high vacuum.[6] Further purification was effected by taking the residue up in chloroform and washing with aqueous 5% sodium bicarbonate solution. The chloroform portion was then dried over anhydrous sodium sulfate, filtered, and evaporated in vacuo to give 15.1 g. (56% yield) of 3-chloro-5-(4-nitrobenzylsulfonyl)-1,2,4-thiadiazole. Recrystallization of the crude product from methanol gave pure 3-chloro-5-(4-nitrobenzylsulfonyl)-1,2,4-thiadiazole, M.P. 137-138° C.

Calculated for $C_9H_6ClN_3O_4S_2$ (percent): C, 33.81; H, 1.89; S, 20.06. Found (percent): C, 33.80; H, 2.04; S, 19.95.

Other representative 3-(halogen)-5-(organosulfonyl)-1,2,4-thiadiazoles of this invention which can be prepared in an analogous manner include the following:

| Compound | Yield, percent | Melting point, °C. | Boiling point, °C./mm. Hg |
|---|---|---|---|
| 3-chloro-5-(isopropylsulfonyl)-1,2,4-thiadiazole | 60 | 59-61 | |
| 3-chloro-5-(n-butylsulfonyl)-1,2,4-thiadiazole | 45 | | 107/0.55 |
| 3-chloro-5-(hexylsulfonyl)-1,2,4-thiadiazole | 64 | | 126-129/0.20 |
| 3-chloro-5-(decylsulfonyl)-1,2,4-thiadiazole | 85 | 40.5-41 | |
| 3-chloro-5-(benzylsulfonyl)-1,2,4-thiadiazole | 62 | 126.5-127 | |

To obtain 3-(halogen)-5-(organosulfonyl)-1,2,4-thiadiazoles from 3 - (halogen)-5-(organothio)-1,2,4-thiadiazoles which contain oxidizable radicals at the 5 position in addition to the sulfur atom, it is necessary to use an oxidizing agent other than hydrogen peroxide in acetic anhydride and glacial acetic acid. m-Chloroperbenzoic acid is an example of the oxidizing agents which

[6] This workup procedure can be varied for soluble products.

EXAMPLE 12

Preparation of 3-chloro-5-(allylsulfonyl)-1,2,4-thiadiazole

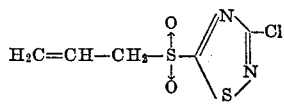

To a stirred solution of 3-chloro-5-(allylthio)-1,2,4-thiadiazole (14.1 g., 0.07 mole) dissolved in 225 ml. chloroform cooled to 0° C. was added dropwise 25 g. of 80% m-chloroperbenzoic acid (0.21 mole) also dissolved in chloroform. After the addition was complete, the reaction mixture was stirred for 1 hour at 0° C. and 3 hours at room temperature. The slurry which resulted was filtered, and the chloroform soluble filtrate was washed with a 5% solution of sodium bicarbonate in water and finally dried over anhydrous sulfate. Filtration and evaporation of the chloroform solution gave 14.0 g. (86% yield) of colorless oil which crystallized on standing. Recrystallization of the crude product from methanol gave pure 3-chloro-5-(allylsulfonyl)-1,2,4-thiadiazole, M.P. 65–67° C.

Calculated for $C_5H_5ClN_2O_2S_2$ (percent): C, 26.73; H, 2.24; S, 28.54. Found (percent): C, 26.60; H, 2.99; S, 28.69.

As discussed above the novel compounds of the present invention possess a high degree of pesticidal and growth regulatory activity. The range of this activity is indicated by the following examples:

EXAMPLE 13

The compounds of the present invention possess fungicidal activity on undesirable species such as *Helminthosporium sativum* (A), *Rhizoctonia solani* (B), *Fusarium roseum* (C), and *Ustilago striiformis* (D) as shown by the data tabulated below:

Rate of application: 10 lbs./acres.

| Compound | Kill (percent) | | | |
|---|---|---|---|---|
| | A | B | C | D |
| 3-chloro-5-(methylthio)-1,2,4-thiadiazole | 100 | 100 | 100 | |
| 3-chloro-5-(ethylthio)-1,2,4-thiadiazole | 100 | 90 | 91 | 100 |
| 3-chloro-5-(butylthio)-1,2,4-thiadiazole | 100 | 0 | 54 | 90 |
| 3-chloro-5-(decylthio)-1,2,4-thiadiazole | 84 | 0 | 0 | 0 |
| 3-chloro-5-(benzylthio)-1,2,4-thiadiazole | 90 | 0 | 68 | 81 |
| 3-chloro-5-(4-nitrobenzylthio)-1,2,4-thiadiazole | 88 | 100 | 0 | 54 |
| 3-chloro-5-(allylthio)-1,2,4-thiadiazole | 100 | 100 | 99 | 75 |
| 3-chloro-5-(methylsulfinyl)-1,2,4-thiadiazole | 100 | 100 | 100 | 100 |
| 3-chloro-5-(butylsulfinyl)-1,2,4-thiadiazole | 100 | 100 | 100 | 100 |
| 3-chloro-5-(isopropylsulfinyl)-1,2,4-thiadiazole | 100 | 100 | 100 | 100 |
| 3-chloro-5-(methylsulfonyl)-1,2,4-thiadiazole | 100 | 100 | 100 | |
| 3-chloro-5-(isopropylsulfonyl)-1,2,4-thiadiazole | 100 | 100 | 100 | 100 |
| 3-chloro-5-(hexylsulfonyl)-1,2,4-thiadiazole | 100 | 100 | 100 | 100 |

In the tests in which the foregoing data was obtained 29.2 mg. of the active compound was mixed with four drops of Tween 20 (polyoxyethylene sorbitan monolaurate), 2 ml. of acetone, and 2 ml. of distilled water. To this mixture was added 80 ml. of nutritive agar. The resulting mixture was poured into Petri dishes (20 ml. per dish) and four plugs cut from pure cultures of the pathogenic fungi listed above were placed with uniform spacing on the surface of the agar in each dish.

The Petri dishes thus prepared were incubated for seven days at 80° F. Percentage of kill was then calculated, using plugs incubated on untreated agar as a standard.

EXAMPLE 14

The compounds of the present invention exhibit a high degree of insecticidal activity as shown by the following data obtained from tests an *Drosophilia* spp. (fruit fllies).

| Compound | Percent kill | | |
|---|---|---|---|
| | 1 hr. | 3 hrs. | 6 hrs. |
| 3-chloro-5-(methylthio)-1,2,4-thiadiazole | 0 | 100 | 100 |
| 3-chloro-5-(isopropylthio)-1,2,4-thiadiazole | 60 | 100 | 100 |
| 3-chloro-5-(hexylthio)-1,2,4-thiadiazole | 0 | 100 | 100 |
| 3-chloro-5-(allylthio)-1,2,4-thiadiazole | 100 | 100 | 100 |
| 3-chloro-5-(methylsulfinyl)-1,2,4-thiadiazole | 0 | 60 | 100 |
| 3-chloro-5-(isopropylsulfinyl)-1,2,4-thiadiazole | 100 | 100 | 100 |
| 3-chloro-5-(butylsulfinyl)-1,2,4-thiadiazole | 100 | 100 | 100 |
| 3-chloro-5-(methylsulfonyl)-1,2,4-thiadiazole | 0 | 100 | 100 |
| 3-chloro-5-(butylsulfonyl)-1,2,4-thiadiazole | 100 | 100 | 100 |

In the tests in which the above data was obtained the active compounds were mixed with Tween 20 and water in amounts providing 1000 p.p.m. of active ingredient. Filter paper discs were saturated with 1 cc. of the active ingredient solutions, placed in Petri dishes, and allowed to dry. Five flies were then placed in each dish together with food for the flies, and the dishes were covered and incubated at room temperature. Counts of living and dead flies were made and percentage of kill calculated at the intervals identified above.

EXAMPLE 15

The compounds disclosed herein have also been found to possess a high degree of biological growth regulatory activity in the vapor phase and are accordingly valuable as fumigants. Such activity is demonstrated by the data tabulated below, which was obtained from tests on *Barbarea* spp. (winter cress).

Rate: 20 lbs./acre.

| Compound | Percent | |
|---|---|---|
| | Kill | Inhibition |
| 3-chloro-5-(methylthio)-1,2,4-thiadiazole | 55 | 75 |
| 3-chloro-5-(ethylthio)-1,2,4-thiadiazole | 100 | 100 |
| 3-chloro-5-(isopropylthio)-1,2,4-thiadiazole | 75 | 25 |
| 3-chloro-5-(butylthio)-1,2,4-thiadiazole | 55 | 40 |
| 3-chloro-5-(allythio)-1,2,4-thiadiazole | 90 | 50 |

In the tests in which the foregoing data was obtained ten seeds of the test plant were presoaked for six hours at room temperature and then seeded on blotting paper previously wetted with distilled water and placed in a plastic box. The active compounds (80 mg.) were each mixed with five milliliters of distilled water and stirred into five to ten grams of soil in a small, open top container.

The containers with the active ingredients were placed in the plastic boxes, which were covered. After 18 hours the containers with the active ingredients were removed from the plastic boxes, which were then recovered and germinated for one week at alternating temperatures of 68 to 86° F. The plastic boxes were then removed from the germinator and percentage of kill and of reduction of germination (inhibition) calculated, using untreated seeds as standards.

EXAMPLE 16

The compounds of the present invention further exhibit a high degree of pre-emergence activity on undesirable species such as *Digitaria sanquinalis* (A), *Amarathus retroflexus* (B), *Cuhorium intybus* (C), and *Trifolium repens* (D) as shown by the following data:

Rate of application: 25 lbs./acre.

| Compound | Percent kill | | | |
|---|---|---|---|---|
| | A | B | C | D |
| 3-chloro-5-(butylthio)-1,2,4-thiadiazole | 100 | 100 | 100 | 100 |
| 3-chloro-5-(isobutylthio)-1,2,4-thiadiazole | 100 | 100 | | |
| 3-chloro-5-(allylthio)-1,2,4-thiadiazole | 100 | 100 | 100 | 100 |
| 3-chloro-5-(benzylthio)-1,2,4-thiadiazole | 100 | 100 | 23 | 96 |
| 3-chloro-5-(methylsulfinyl)-1,2,4-thiadiazole | 100 | 100 | | |
| 3-chloro-5-(isopropylsulfinyl)-1,2,4-thiadiazole | 100 | 100 | | |
| 3-chloro-5-(butylsulfonyl)-1,2,4-thiadiazole | 87 | 100 | 67 | 100 |
| 3-chloro-5-(hexylsulfonyl)-1,2,4-thiadiazole | 88 | 100 | 100 | 100 |
| 3-chloro-5-(allylsulfonyl)-1,2,4-thiadiazole | 62 | 100 | 94 | 100 |
| 3-chloro-5-(ethoxyethylenesulfonyl)-1,2,4-thiadiazole | 100 | 100 | | |

The pre-emergence tests in which the foregoing data was obtained were conducted as follows: soil was placed in plastic boxes to a depth of one-half inch and levelled. Seeds of the four test plants were planted in separate rows (25 seeds per row) in each container, and each container was watered with 20–40 ml. of distilled water.

57.9 mg. of each active compound was dispersed in 25 grams of sand, and the resulting mixture applied to the containers, which were then placed in a growth chamber. Percent controls was recorded 8–12 days after application of the active compounds.

It will be appreciated that the instant specification and foregoing examples are set forth by way of illustration and not limitation and that various modifications and changes may be made without departing from the spirit and scope of the present invention, which is intended to be limited only by the appended claims.

We claim:
1. A 3-(halogen)-5-(organosulfinyl)-1,2,4-thiadiazole having the formula

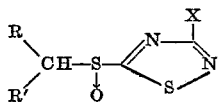

wherein R' is hydrogen or $C_1$–$C_9$ alkyl, X is chlorine or bromine and R is hydrogen, $C_1$–$C_9$ alkyl, phenyl, phenyl substituted by halogen, nitro, $C_1$–$C_4$ alkoxy, or $C_1$–$C_4$ alkyl or a combination thereof, $C_1$–$C_4$ alkoxymethyl, carbamoyl, or $C_1$–$C_4$ carboalkoxy.

2. 3-chloro-5-(methylsulfinyl)-1,2,4-thiadizole.
3. 3-bromo-5-(methylsulfinyl)-1,2,4-thiadiazole.
4. The compound of the formula

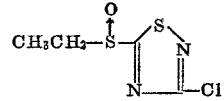

References Cited
UNITED STATES PATENTS
| | | | |
|---|---|---|---|
| 3,090,721 | 5/1963 | Uhenlbrock et al. | 260—302 |
| 3,159,644 | 12/1964 | Stephen | 260—302 |
| 3,260,725 | 9/1965 | Schroeder | 260—302 |

OTHER REFERENCES
Yale: J. Med. Chem., vol. 1 (3), 1959, pp. 121–33.

ALEX MAZEL, Primary Examiner

R. J. GALLAGHER, Assistant Examiner

U.S. Cl. X.R.

71—90; 260—465 E, 465 S; 424—270